(12) United States Patent
Petrie et al.

(10) Patent No.: US 7,808,956 B2
(45) Date of Patent: Oct. 5, 2010

(54) DYNAMIC, ADAPTIVE POWER CONTROL FOR A HALF-DUPLEX WIRELESS COMMUNICATION SYSTEM

(75) Inventors: Michael C. Petrie, Hoffman Estates, IL (US); Sanjay G. Desai, Lake in the Hills, IL (US); Gary P. Hunsberger, Schaumburg, IL (US); John De Sabatino, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 659 days.

(21) Appl. No.: 11/394,418

(22) Filed: Mar. 31, 2006

(65) Prior Publication Data

US 2007/0230407 A1    Oct. 4, 2007

(51) Int. Cl.
*H04B 7/212* (2006.01)
(52) U.S. Cl. .................. 370/337; 370/318; 370/321; 455/522
(58) Field of Classification Search .............. 370/318, 370/321, 337; 455/522
See application file for complete search history.

(56) References Cited

U.S. PATENT DOCUMENTS

| | | | | |
|---|---|---|---|---|
| 5,940,430 A | * | 8/1999 | Love et al. | 375/130 |
| 5,949,754 A | * | 9/1999 | Takahashi | 370/222 |
| 5,999,832 A | * | 12/1999 | Vannatta et al. | 455/575.1 |
| 6,035,209 A | * | 3/2000 | Tiedemann et al. | 455/522 |
| 6,072,792 A | * | 6/2000 | Mazur et al. | 370/345 |
| 2002/0054577 A1 | | 5/2002 | Gaskill | |
| 2002/0057666 A1 | * | 5/2002 | Hamabe et al. | 370/345 |
| 2003/0036403 A1 | * | 2/2003 | Shiu et al. | 455/522 |
| 2003/0186718 A1 | * | 10/2003 | Raaf et al. | 455/522 |
| 2003/0207695 A1 | | 11/2003 | Chang | |
| 2005/0032540 A1 | * | 2/2005 | Lee et al. | 455/522 |
| 2006/0040669 A1 | * | 2/2006 | Innami | 455/442 |

OTHER PUBLICATIONS

Aldajani, et al., "Adaptive Predictive Power Control for the Uplink Channel in DS-CDMA Cellular Systems"; IEEE Transactions on Vehicular Technology, vol. 52, No. 6, Nov. 2003.
Fredrik Berggren, "Power Control and Adaptive Resource Allocation in DS-CDMA Systems", Radio Communication Systems Laboratory, Kungl Tekniska Hogskolan, Royal Institute of Technology, Jun. 2003.

* cited by examiner

*Primary Examiner*—Rafael Pérez-Gutiérrez
*Assistant Examiner*—Liton Miah
(74) *Attorney, Agent, or Firm*—Indira Saladi; Valerie M. Davis

(57) ABSTRACT

The power of a signal transmitted from a mobile terminal of a half-duplex TDMA communication system to a base station is controlled by collecting data relating to bit errors in the transmitted signal received on an inbound channel, generating a time-varying statistic of the data. If the time varying statistic indicates that the power should be adjusted, a power control command is embedded in one or more time slots of an outbound channel to the mobile terminal to change the power of the signal. The data may be the bit error rate (BER) reported by a forward error correction decoder and/or returned signal strength information (RSSI). The time varying statistic may be the moving average and standard deviation of the data.

16 Claims, 6 Drawing Sheets

DYNAMIC, ADAPTIVE POWER CONTROL FOR A HALF-DUPLEX WIRELESS COMMUNICATION SYSTEM

BACKGROUND

Power control is an important radio resource management method in radio communication systems. Use of excessive power decreases battery life and increases co-channel interference. Power control aims to control the transmission power levels in such a way that acceptable quality of service for the users is guaranteed with lowest possible transmission powers.

Types of power control include Open Loop, Outer Loop and Closed Loop. Open Loop power control is used in the beginning of a radio link connection establishment to set the transmission power according to measurements of the return channel link gain. Outer loop power control sets the target signal-to-interference ratio (SIR) to such a level that sufficient quality of service is guaranteed. Closed loop power control aims to keep the receiver SIR at this target value using feedback signals from the receiver. For example, adaptive, closed loop power control algorithms have been proposed for CDMA (Code Division Multiple Access) cellular communication systems.

In closed-loop power control, the base station (BS) (also known as a base radio or repeater) measures the fading effects in the signal received from each mobile station by measuring the signal power and the bit-error rate (BER). Typically, the received power is measured by averaging multiple samples of the received sequence, while the BER is computed by comparing the received sequence with a predetermined transmitted sequence. The base station then compares these quantities with a reference point. Based on this comparison, the base station transmits a one-bit signal, known as the power bit, to each mobile station (MS) (also known as a subscriber unit), commanding it to either increase or decrease its power by a fixed amount, e.g., 1, 0.5, or 0.25 dB. For example, the power bit rate is 800 Hz in IS-95 standards and 1500 Hz in 3G WCDMA standards.

A problem in closed-loop power control is that extensive control signaling consumes radio channel bandwidth. Further, most closed-loop power control algorithms assume a full-duplex mobile station (MS) in order to adjust transmission power during a transmission. With a half-duplex MS, closed-loop power control cannot be achieved during a transmission without introducing periods of time where the MS stops transmitting on the up-link in order to receive feedback on the down-link.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
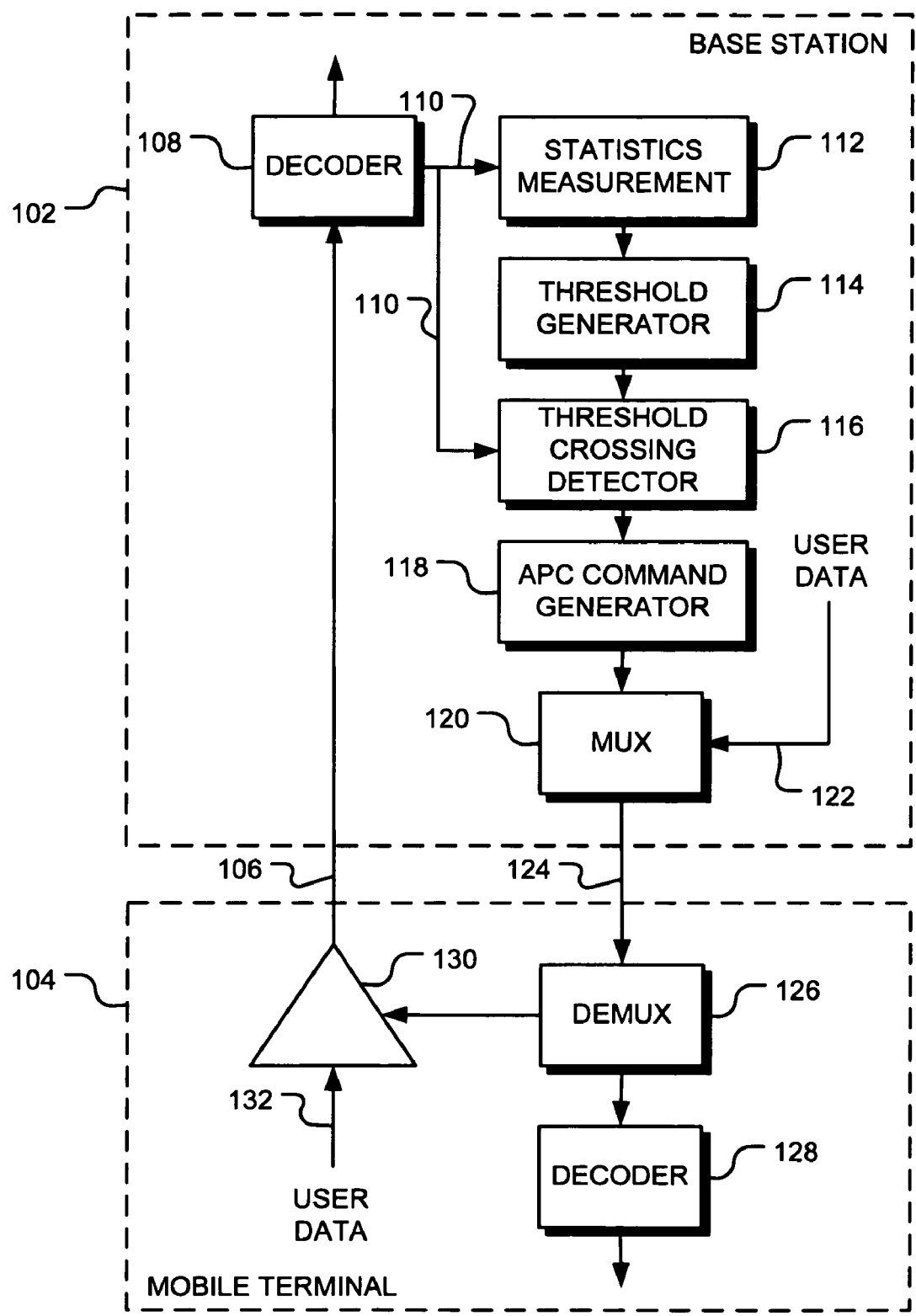
FIG. 1 is a diagram of a system utilizing dynamic adaptive power control consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

Many wireless communication protocols provide a means to send reverse channel signaling to the transmitting mobile device, but most assume a full-duplex mobile station (MS). One example where the MS can operate as half-duplex and still receive reverse channel signaling during a transmission is the Motorola two-slot TDMA air interface protocol. The MS may be a handheld or vehicle radio or a radio telephone, for example. This protocol is proposed as the basis for standards such as proposed Association of Public Safety Communications Officers (APCO) phase 2 standard. In this protocol, reverse channel signaling is provided through an outbound slot, burst embedded, Link Control (LC).

Adaptive Power Control (APC) can take advantage of the reverse channel as a means of providing real time feedback of information to the transmitting subscriber. In one embodiment, the information includes the Bit Error Rate (BER) and Received Signal Strength Information (RSSI). This feedback of information enables the transmitting mobile device to make power control adjustments during a call.

A problem in closed-loop power control is that extensive control signaling consumes radio resources, and thus the control feedback bandwidth must be limited. The present invention relates to a method for sending an APC commands during an MS transmission on a half-duplex channel and a method for determining, dynamically, when to use a reverse channel for APC signaling.

In one embodiment, the source site Base Radio creates and embeds an APC LC in the reverse channel as soon as BER and RSSI measurements are first available. Thereafter, APC LC's are only created and embedded in the reverse channel when a statistically significant BER or RSSI change from the previously transmitted measurements is detected. For example, the statistical threshold may be a fixed or programmable deviation from the mean.

This approach provides timely feedback to the subscriber device with minimal impact on other signaling being provided in the reverse channel.

FIG. 1 is a diagram of a system utilizing dynamic adaptive power control consistent with certain embodiments of the invention. FIG. 1 shows a base radio station 102 (BS) and a mobile terminal or station 104 (MS). The base station 102 receives signal 106 from the mobile terminal 104. The signal may contain multiple voice and/or data frames. The signal 106 is decoded in decoder 108. The decoder collects information 110 relating to the quality of the received signal 106. In one embodiment of the invention, the decoder is an FEC decoder that uses a forward error correction (FEC). In operation, the FEC decoder keeps track of the number of bit errors found. In one embodiment, the total errors detected in each of the bursts are added at the end of each super-frame. The decoder 108 also reports the Received Signal Strength Information (RSSI). Statistical Measurement Unit 112 receives the signal quality information 110 and calculates temporal statistics of the information. In one embodiment, the Statistical Measurement Unit 112 may compute a moving average of the number of bit errors per super-frame and/or the average number of bit errors per burst within the super-frame. For example, the moving average may be calculated over the past 20 super-frames, where each super-frame comprises 6 bursts. Once the $21^{st}$ super-frame is received, the average from first super-frame through to the $21^{st}$ super-frame can be computed. The average can be updated with every new super frame (or even every new burst). In addition to the average number of errors, statistical moments (such as the standard deviation) of the bit errors may also be calculated. The moving average and the statistical moments characterize the statistical distribution of the bit errors seen in past 20 super-frames.

Threshold generator 114 operates to compute threshold levels dependent upon the statistical information (such as the moving average and standard deviation). These thresholds are dynamic thresholds that vary as the statistical information varies. The thresholds are used in a threshold crossing detector 116 to determine if a new command should be sent to the mobile terminal to allow it to increase or decrease the power level of the signal 106. The thresholds are set according to the desired degree of confidence with which a "change power level" message is sent to the subscriber. 'Tight' thresholds result in more frequent messages and a greater probability of sending redundant information.

During the process of receiving and processing voice bursts in a voice call, the number of bit errors received in the most recent super-frame (or burst) is calculated. This information is compared to the dynamic thresholds in the threshold crossing detector 116. Because of the random nature of the channel, the bit errors per super-frame will change from burst to burst and from super-frame to super-frame. While the average value allows for some smoothing, the use of the standard deviation, or other measures of the variation about the average value, provides better control and a higher degree of confidence. Some variation in bit errors about the mean value will always occur, but if the threshold is set to Mean +/−N*Standard_Deviation, where N is a scale factor (1, 2 or 3, for example) then there is a higher confidence in the decision to instruct the terminal to change its power levels with each increasing value of N.

In one embodiment, if the number of errors found in the most recent burst is greater than the upper threshold, Mean+N*Standard_Deviation, it is concluded that mobile terminal should increase its power level by an amount determined from the value of N. A smaller value of N requires a smaller increase in power level. A larger value of N means that subscriber needs to increase its power by a larger amount.

Similarly, if the number of errors found in the most recent burst is less that the lower threshold Mean−N*Standard_Deviation, it is concluded that the mobile terminal needs to decrease its power level by an amount determined from the value of N. A smaller value of N requires a smaller decrease in power level. A larger value of N means that subscriber needs to decrease its power by a larger amount The statistical methods allow for power level compensation in time varying channel conditions. The number of errors per burst varies, and the variation depends upon the channel condition at that time. Using time varying statistics, such as a moving average of bit errors over past time interval and the standard deviation, adds a degree of robustness to the design and the decision making process.

When a threshold crossing is detected, an APC command generator 118 generates an Adaptive Power Control (APC) command that instructs the mobile terminal to increase or decrease its power level. This command may be a binary command (increase/decrease) or may be a command that specifies the amount by which the power level is to be changed. Alternatively, the command may include the RSSI and BER values or other data.

Multiplexer 120 multiplexes the APC command with the user data 122 to be transmitted. The APC command is embedded in a message packet or frame so that a half duplex mobile device can receive the data in between its transmission bursts. The complete signal 124 is then transmitted to the mobile device 104 over the communication link.

In the mobile device 104, the signal 124 is de-multiplexed in DEMUX unit 126. The data component is passed to decoder 128 and the APC command is used to control power amplifier 130. The power amplifier 130 is used to amplify the user signal 132 of the mobile terminal. If the mobile station determines that the link control packet was an APC command directed to its individual ID, it may change its power based on the received RSSI and BER values. If the mobile station does change its power, it will take affect on the next transmit slot following reception of the APC command.

Figure 2:
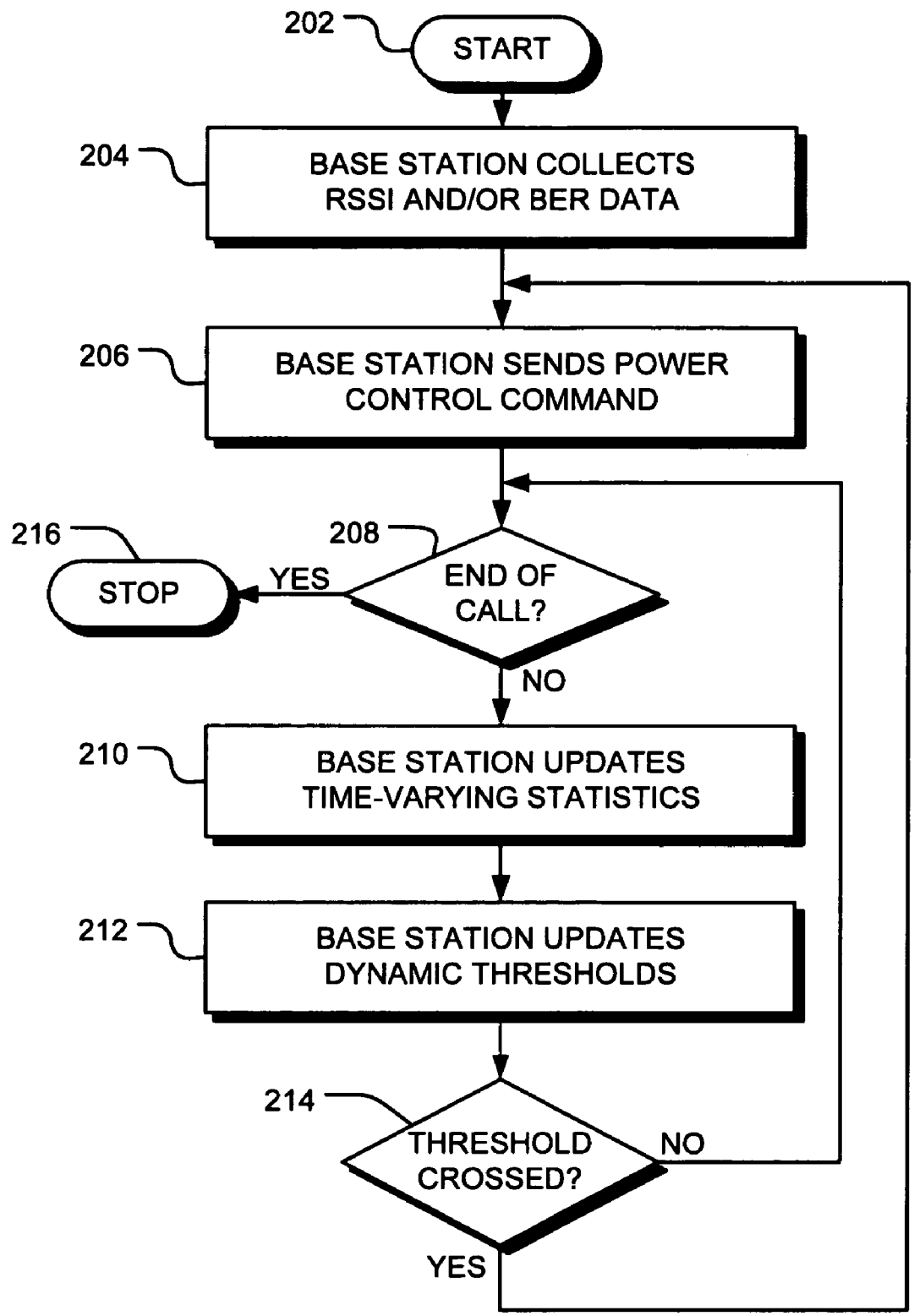
FIG. 2 is a flow chart of a method of adaptive power control consistent with certain embodiments of the invention.

FIG. 2 is a flow chart of a method of adaptive power control consistent with certain embodiments of the invention. Referring to FIG. 2, following start block 202 that denotes the start of a call received by a base station, the base station collects initial RSSI and BER data at block 204. Based on these data, the base station sends an APC command to the mobile terminal at block 206. The base station may queue the APC command as a high priority message so that the command can be embedded into the outbound stream and processed by the mobile device in a timely fashion. At decision block 208 a check is made to determine if the call has ended. If not, as depicted by the negative branch from decision block 208, the base station updates the time-varying statistics (such as the moving average and standard deviation) at block 210 dependent upon the most recent RSSI and/or BER's reported from the decoder. The dynamic thresholds are updated at block 212. At decision block 214 a check is made to determine if the dynamic thresholds have been crossed, indicating that the received signal is too powerful or is not powerful enough. If a threshold has been crossed, as depicted by the positive branch from decision block 214, flow returns to block 206 and a new APC command is sent to the mobile terminal. If no threshold has been crossed as determined by the negative branch from decision block 214, flow returns to block 208 and no APC command is sent to the mobile terminal. This is in contrast to prior approaches were power control commands are sent at regular intervals even though the power level does not need adjustment. In a further embodiment, an APC command is also sent if a longer term error measure, such as the moving average of the BER, is outside of a prescribed range. If the call ends, as depicted by the positive branch from decision block 208, the process terminates at block 216.

An APC command may also be sent if an error indicator is outside of a fixed range. For example, if the moving average of the BER is greater than an upper fixed threshold or less a lower fixed threshold an APC command is sent. Since the moving average is relatively slow to respond to gain changes, additional APC commands are not sent until the moving average has had sufficient time to settle to a new value after a gain change.

Use of the dynamic thresholds allows the system to respond quickly to sudden changes in the BER, while the use of fixed thresholds allows the system to respond to a slowly varying or drifting BER.

A pseudo-code of the method is listed below.

```
collect initial moving average;
collect initial standard deviation;
send first APC command;
set upper and lower thresholds;
while not end of call:
    get new measurement;
    update moving average;
    update standard deviation;
    update upper and lower dynamic thresholds;
    if minimum time elapsed since last APC command
        if new measurement > upper dynamic threshold
            send APC command;
        elseif new measurement<lower dynamic threshold
            send APC command;
        elseif moving average > upper fixed threshold
            send APC command;
        elseif moving average < lower fixed threshold
            send APC command;
        endif
    endif
endwhile;
```

Upon receipt of an APC command, the mobile terminal may decide to update the power level of the transmitted signal. In one embodiment, the APC command includes data relating to the error rate, such as the bit error rate (BER) and/or received signal strength information (RSSI). The mobile uses this data to determine if a change to the power level is required and, optionally, the size of the change.

Figure 3:
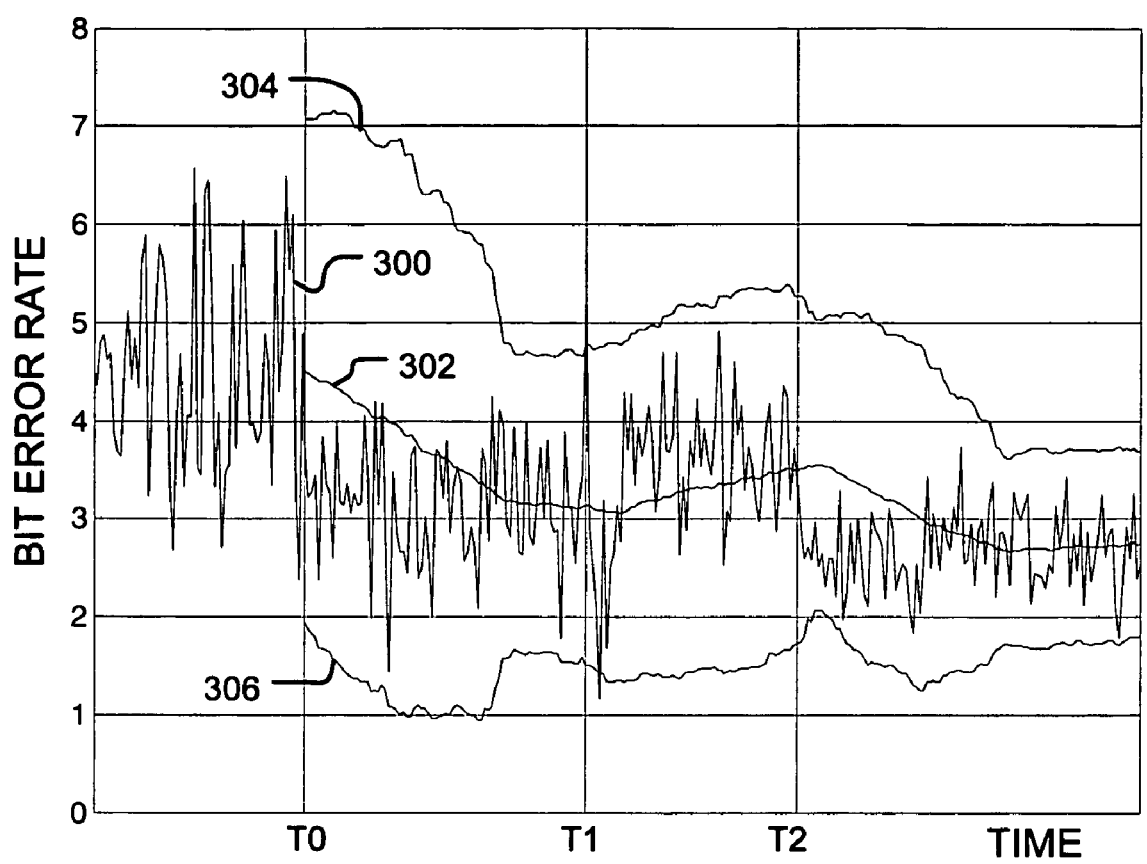
FIG. 3 is a graph of an exemplary bit error rate as a function of time, also showing time-varying statistics consistent with certain embodiments of the invention.

FIG. 3 is a graph of an exemplary bit error rate as a function of time. In this example, the bit error rate 300 shows a tendency to increase over time. However, due to random components in the transmitted signal, the bit error rate fluctuates rapidly over short time periods. The middle broken line 302 is a moving average of the bit error rate calculated over most recent 60 measurements. The upper broken line 304 shows the upper dynamic threshold which is calculated as the moving average plus 2.5 times the standard deviation of the bit error rate. The standard deviation is also computed over the most recent 60 measurements. The lower broken line 306 shows the lower dynamic threshold which is calculated as the moving average minus 2.5 times the standard deviation of the bit error rate. The upper and lower dynamic thresholds define a range that contains most of the measurements. Only occasionally does a measurement fall outside of this range. The rate at which this occurs can be controlled by increasing or decreasing the multiplier on the standard deviation. Confidence bounds on statistical data are well known to those of ordinary skill in the art. The upper and lower thresholds are initialized at time T0 (when 60 measurements have been acquired) and are then updated every time a new measurement is available. In FIG. 3, the upper dynamic threshold is crossed at time T1. In this example, the BER had a sudden increase at time T1.

Figure 4:
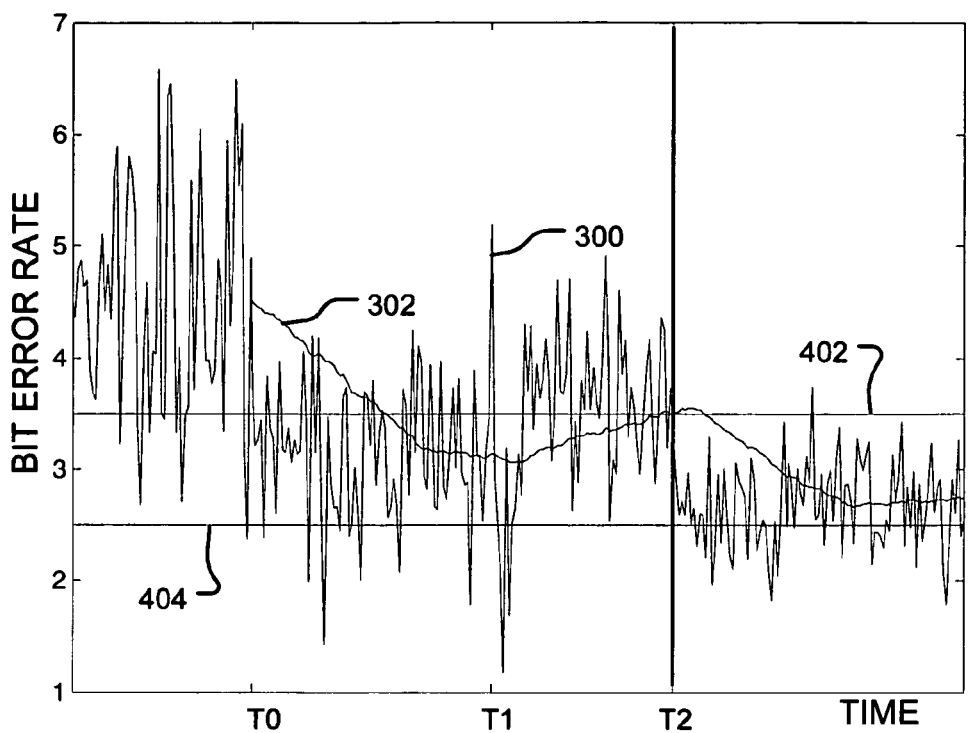
FIG. 4 is a graph of an exemplary bit error rate as a function of time, also showing upper and lower dynamic thresholds, consistent with certain embodiments of the invention.

FIG. 4 is another graph of the exemplary bit error rate 300 as a function of time. Also shown in FIG. 4 are the moving average 302, an upper fixed threshold 402 and a lower fixed threshold 404, consistent with certain embodiments of the invention. In this example, the target BER is in the range 2.5 to 3.5. At time T2 the moving average 302 crosses the upper fixed threshold 402 and an APC command is sent to the mobile terminal.

Figure 5:
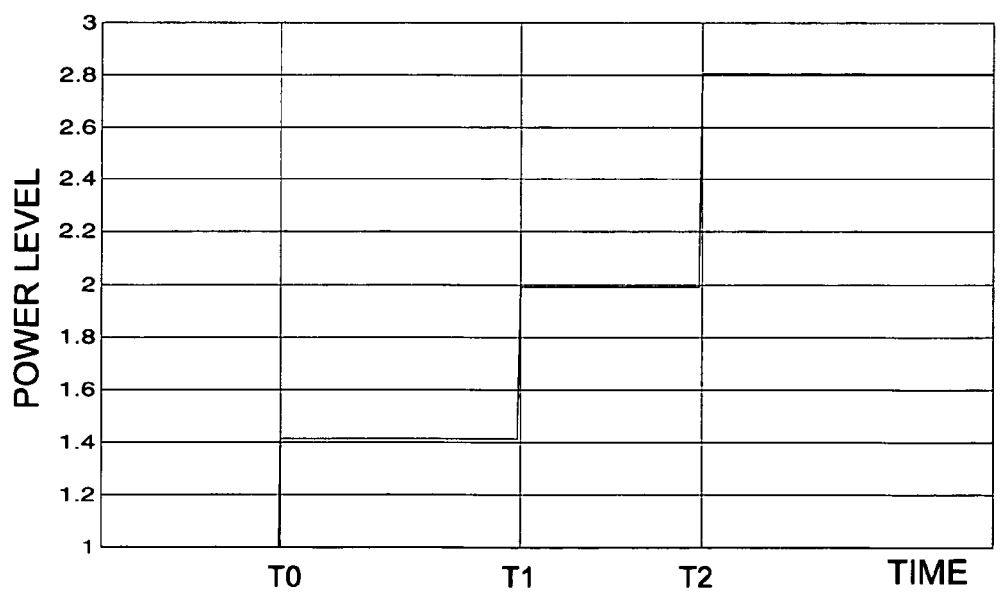
FIG. 5 is graph of power level as a function of time, consistent with certain embodiments of the invention.

FIG. 5 is graph of power level as a function of time, consistent with certain embodiments of the invention. At each of the times T0, T1 and T2 the mobile terminal receives an APC command. The APC command may be a single bit indicating which threshold has been crossed or may include data related to the bit error rate, such as the BER, RSSI and associated moving averages and standard deviations. Based on the received information, the mobile terminal may update the power level of the transmitted signal. In this example, the mobile terminal increased the power level by 3 dB at times T0, T1 and T2. The graph of FIG. 5 shows four power levels. However, the mobile station many have any number of power levels.

In this example, the BER was controlled to lie in the target range.

FIGS. 3-5 refer to the bit error rate of the transmitted signal. However, other measures related to the probability of bit errors may be used. For example, the returned signal strength information is an indicator of the probability of bit errors, as is the signal to interference ratio. Several different measures may be used in conjunction.

FIG. 6 through FIG. 9 show an exemplary two-slot TDMA air interface as applied to APCO phase 2 communication. The interface enables reverse channel signaling. In one embodiment, the reverse channel signal is used to perform closed loop power control in a system containing a half-duplex mobile station.

Figure 6:
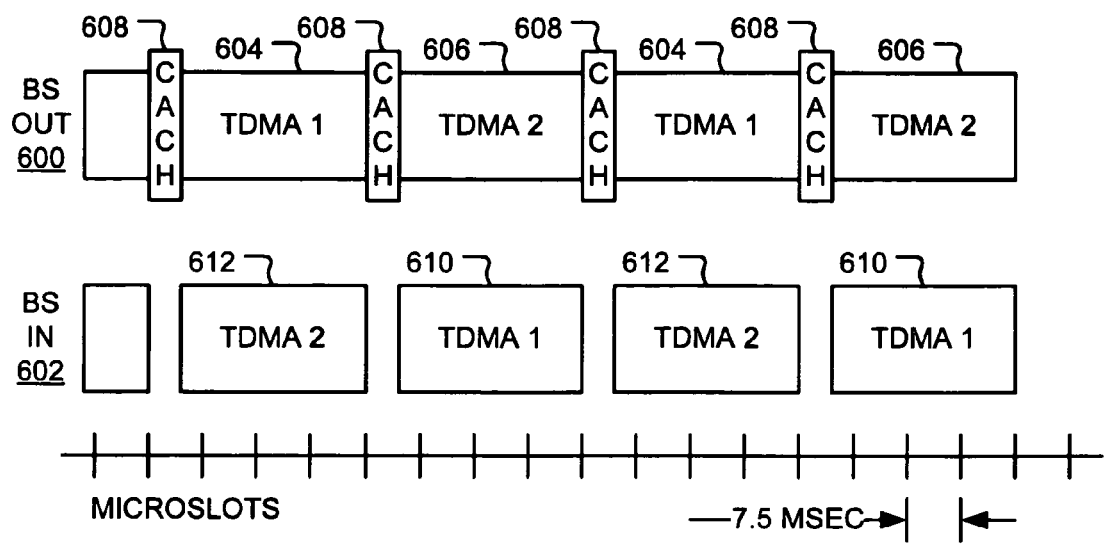
FIG. 6 shows an exemplary time slot alignment of a two-slot Time Division Multiple Access (TDMA) protocol.

FIG. 6 shows the slotting alignment of a proposed APCO phase 2, two-slot Time Division Multiple Access (TDMA) protocol. In a communication system using a TDMA protocol, the radio medium is divided into time slots to carry the communications. In the example shown in FIG. 6, each frequency channel is segmented into two interleaved time slots. The upper diagram in FIG. 6 shows an outbound channel 600 from a base station (BS). The middle diagram in FIG. 6 shows an inbound voice transmission channel 602 received by the BS. In normal operation, the BS accepts an inbound voice transmission in an inbound slot and either repeats the inbound audio or transmits another audio source to the outbound slot in accordance with FIG. 6. The time slots 604 and 606, labeled TDMA 1 and TDMA 2 respectively in FIG. 6, are separated by a Common Announcement Channel (CACH) burst 608. The CACH burst 608 is used for signaling information. An MS assigned to slot 1 will transmit voice on inbound slot 1 (610) in inbound channel 602, and in between transmission bursts is capable of receiving part of the outbound slot 1 burst (612). In FIG. 6, each frame comprises four micro-slots of 7.5 milliseconds each, as indicated by the bottom scale in the figure. Each TDMA slot burst is 27.5 milliseconds and the CACH burst is 2.5 milliseconds.

Figure 7:
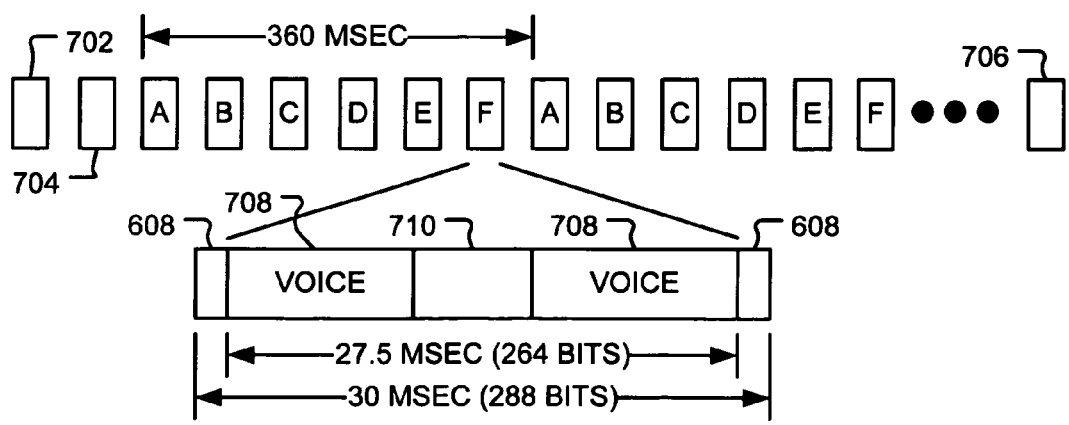
FIG. 7 shows the burst sequence within one slot of a TDMA voice transmission as well as the contents of a generic voice burst.

FIG. 7 shows a voice superframe and illustrates how embedded signaling can be inserted into the middle of a voice burst. The burst sequence in FIG. 7 begins with an LC header 702 and an ESYNC header 704 and is terminated by a terminator burst 706. Bursts A through F form a superframe. Superframes repeat throughout a voice transmission. The BS embeds link control information within specific audio bursts within a voice superframe for broadcast to all MS receivers listening to the outbound slot. The burst sequence is embedded within one slot (slot 1 or slot 2) of either an inbound or outbound voice transmission as well as the contents of a generic voice burst. In FIG. 7, the burst F comprises voice components 708 and a LC signaling component 710 in addition to the CACH information 608. In the example of the proposed APCO phase 2 two slot TDMA protocol, the link control packet would be pieced together from the center of bursts B, C, E, and F.

Figure 8:
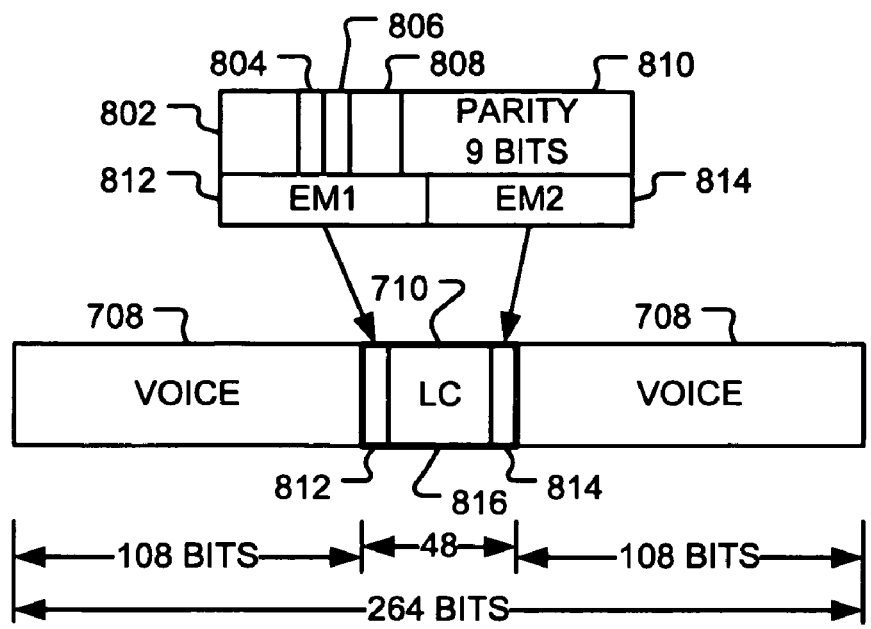
FIG. 8 shows a voice burst containing Link Control information

FIG. 8 shows further detail of a burst containing embedded LC signaling. The upper diagram in FIG. 8 shows a 16-bit information word that comprises three CC bits 802, an end-to-end encryption indicator (EEEI) bit or an algorithm key ID bit 804, an air interface encryption indictor (AIEI) bit 806, two LC framing bits 808 and 9 parity bits 810. The 16-bit information word is split into embedded message (EM) bytes EM1 (812) and EM2 (814). The lower diagram in FIG. 8 shows a 264-bit burst that comprises two 108-bit voice bursts 708, and embedded signaling 710. The first and last bytes of the embedded signaling are the bytes EM1 (812) and EM2 (814), respectively. The middle four bytes 816 carry the LC signal itself (32-bits).

Figure 9:
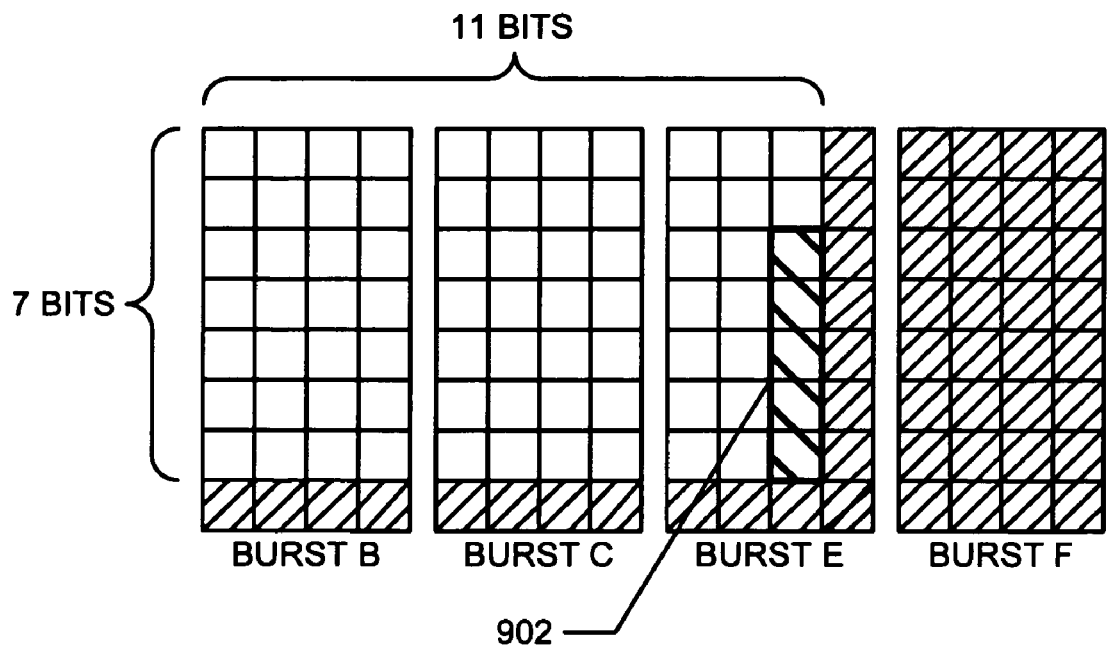
FIG. 9 shows a distribution of Link Control information across voice bursts.

FIG. 9 shows how a LC signal is distributed across voice bursts B, C, E, and F of a superframe. Each square in FIG. 9 represents 1 bit. In this example, 4 of the 32 bits in bursts B and C are reserved, leaving 28 for LC signaling. In Burst E, 11 bits are reserved, leaving 21 bits. Of these 21 bits, 5-bits are used for a checksum 902 and the remaining 16 are used for LC signaling. Thus, in each superframe, 72-bits are available for LC signaling.

Other embedding options, using different bit patterns or frame patterns, will be apparent to those of ordinary skill in the art.

In the specific case where the BS is to provide a reverse channel message targeted to the transmitting MS, the BS will embed link control information containing the individual ID of the transmitting MS so that the MS can identify itself as the target of the message. The transmitting MS can transmit in the inbound burst, and listen for the embedded information in the center of the outbound burst. Since the embedded information is in the center of the burst, the MS can have a slow transmit to receive turnaround time and slow receive to transmit turn-around time.

The present invention, as described in embodiments herein, is implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for adaptive control, in a base station of a time division multiple access (TDMA) communication system, of the power level of a signal transmitted from a half-duplex mobile terminal, the method comprising:
   receiving the transmitted signal in an inbound time slot of a communication channel;
   collecting data relating to bit errors in the transmitted signal;
   generating at least one time-varying statistic of the data;
   determining, from a plurality of time-varying statistics of the data comprising a moving average of the data and a standard deviation of the data, whether to send a power control command to the mobile terminal, wherein the determining comprises,
      generating first and second dynamic thresholds dependent upon the time-varying statistics, wherein the first dynamic threshold is equal to the moving average of the data plus a multiple of the standard deviation of the data and wherein the second dynamic threshold is equal to the moving average of the data minus a multiple of the standard deviation of the data; and
   sending the power control command to the mobile terminal if the first or the second dynamic threshold is crossed, wherein the power control command is embedded in an outbound time slot of the communication channel.

2. A method in accordance with claim 1, wherein the power control command is distributed across a plurality of voice bursts in a superframe for transmission to the mobile terminal.

3. A method in accordance with claim 1, further comprising sending the power control command to the mobile terminal if a time-varying statistic of the plurality of time varying statistics is outside of a prescribed range.

4. A method in accordance with claim 1, wherein the data comprises a bit error rate (BER) of the transmitted signal.

5. A method in accordance with claim 1, wherein the data comprises a received signal strength information (RSSI) of the transmitted signal.

6. A method in accordance with claim 1, wherein collecting data relating to bit errors in the signal comprises decoding the transmitted signal using a forward error correcting decoder.

7. A method in accordance with claim 1, wherein the power control command comprises data relating to at least one of bit errors in the transmitted signal or Received Signal Strength Information (RSSI).

8. A method in accordance with claim 1, further comprising the mobile terminal adjusting the power level of the transmitted signal dependent upon the power control command.

9. A system for adaptive control of the power of a signal transmitted from a half-duplex mobile terminal to a base station of a time division multiple access (TDMA) communication system, the system comprising:
   a signal decoder operable to decode the transmitted signal and report data related to bit errors in the transmitted signal;
   a means for generating a plurality of time-varying statistics of the data comprising a moving average and a standard deviation of the data;
   a means for generating upper and lower thresholds dependent upon the time-varying statistics, wherein the upper threshold is equal to the moving average of the data plus a multiple of the standard deviation of the data and wherein the lower threshold is equal to the moving average of the data minus a multiple of the standard deviation of the data;

a command generator operable to generate a power control command if the upper or lower threshold is crossed; and a multiplexer operable to multiplex the power control command with other data in an outbound time slot of the base station.

10. A system in accordance with claim 9, wherein the signal decoder comprises a forward error correction decoder.

11. A system in accordance with claim 9, wherein the data related to bit errors in the transmitted signal comprises a bit error rate (BER).

12. A system in accordance with claim 9, wherein the data related to bit errors in the transmitted signal comprises received signal strength information (RSSI).

13. A system in accordance with claim 9, wherein the power control command comprises data relating to at least one of bit errors in the transmitted signal or Received Signal Strength Information (RSSI).

14. A method for adjusting the transmission power level of a mobile terminal, the method comprising:

receiving a half-duplex time division multiple access (TDMA) communication signal comprising:

an inbound channel comprising a first sequence of time slots and operable to carry a transmitted signal from the mobile terminal to a base station;

an outbound channel comprising a second sequence of time slots, interleaved with the first sequence of time slots and operable to carry a broadcast signal from the base station to the mobile terminal; and an adaptive power control (APC) command embedded in at least one time slot of the second sequence of time slots;

demultiplexing the half-duplex TDMA communication signal to recover the APC command; and adjusting the power level of the transmitted signal in response to the APC command, wherein the APC command is embedded only when data related to bit errors in the transmitted signal are outside of upper and lower thresholds that are dependent upon an average value of the data and a measure of the variation about the average value of the data, wherein the upper threshold is equal to a moving average of the data plus a multiple of a standard deviation of the data and wherein the lower threshold is equal to the moving average of the data minus a multiple of the standard deviation of the data.

15. A method in accordance with claim 14, wherein the half-duplex TDMA communication signal further comprises a link command (LC) signal embedded in at least one time slot of the second sequence of time slots.

16. A method in accordance with claim 14, wherein the APC command comprise data relating to at least one of a time-varying statistic of bit errors in the transmitted signal or Received Signal Strength Information (RSSI).

* * * * *